July 12, 1955  P. M. SAMPATACOS ET AL  2,712,835
MACHINE FOR MAKING PARTLY OPEN RINGS
Filed April 25, 1952  4 Sheets-Sheet 1
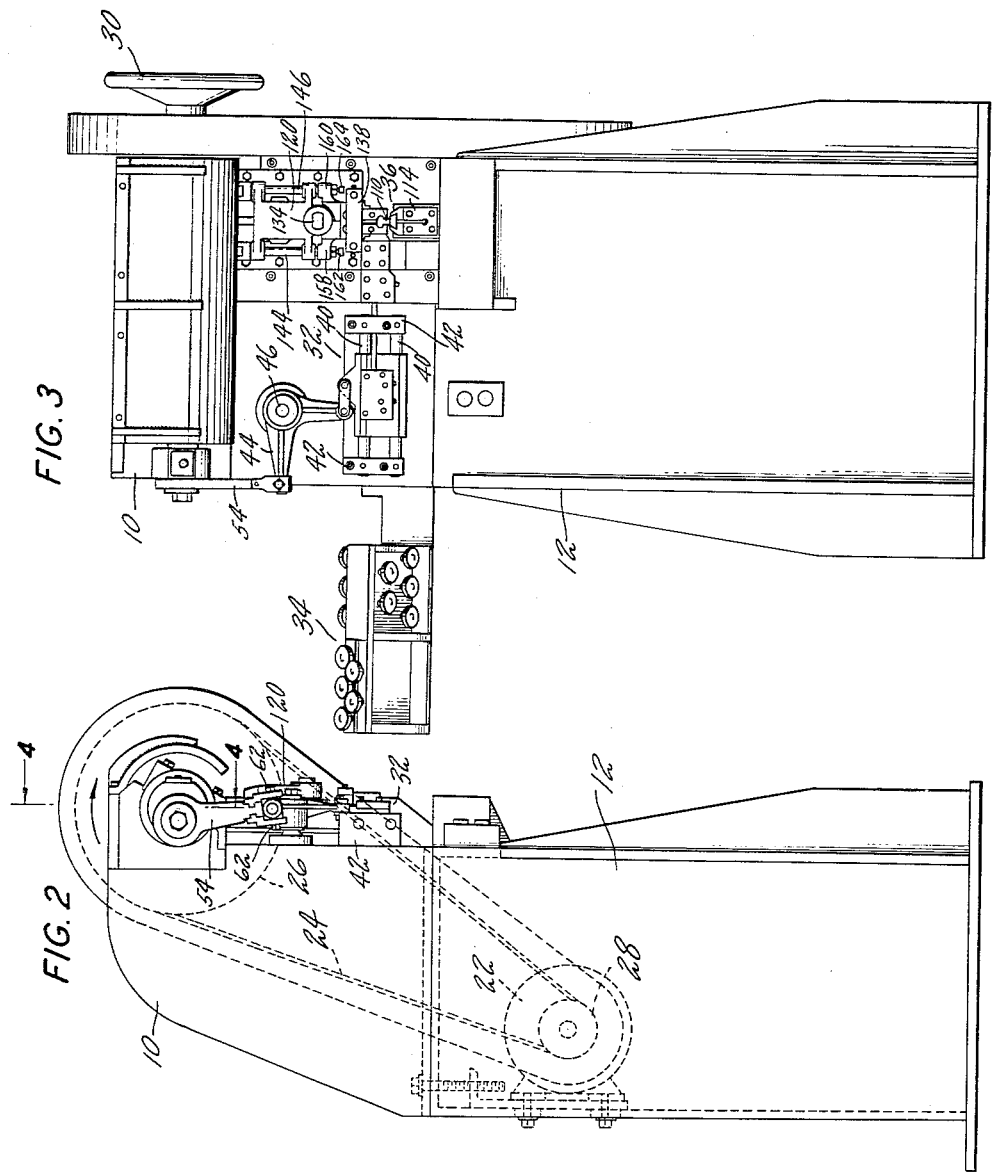
INVENTORS
PETER M. SAMPATACOS
EDWARD E. FRANKS JR.
BY *J. Jay Teller*
ATTORNEY July 12, 1955    P. M. SAMPATACOS ET AL    2,712,835
MACHINE FOR MAKING PARTLY OPEN RINGS
Filed April 25, 1952                      4 Sheets-Sheet 2
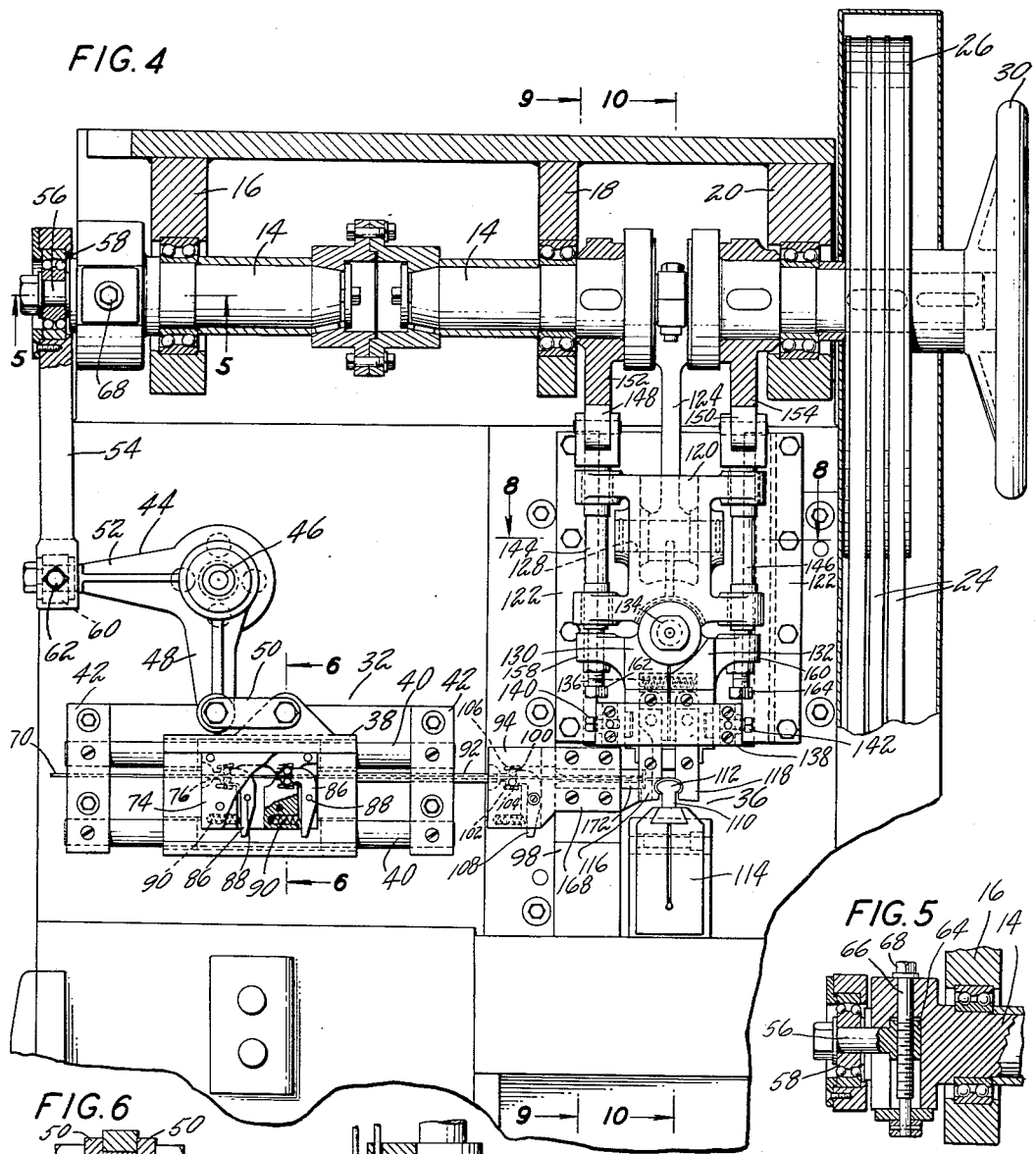
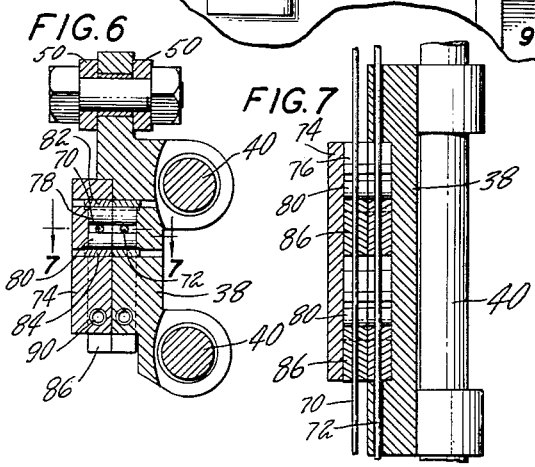
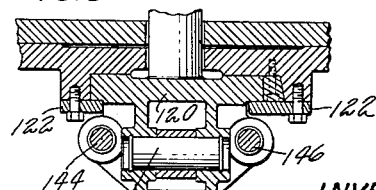
INVENTORS
PETER M. SAMPATACOS
EDWARD E. FRANKS JR.
BY S. Jay Teller
ATTORNEY

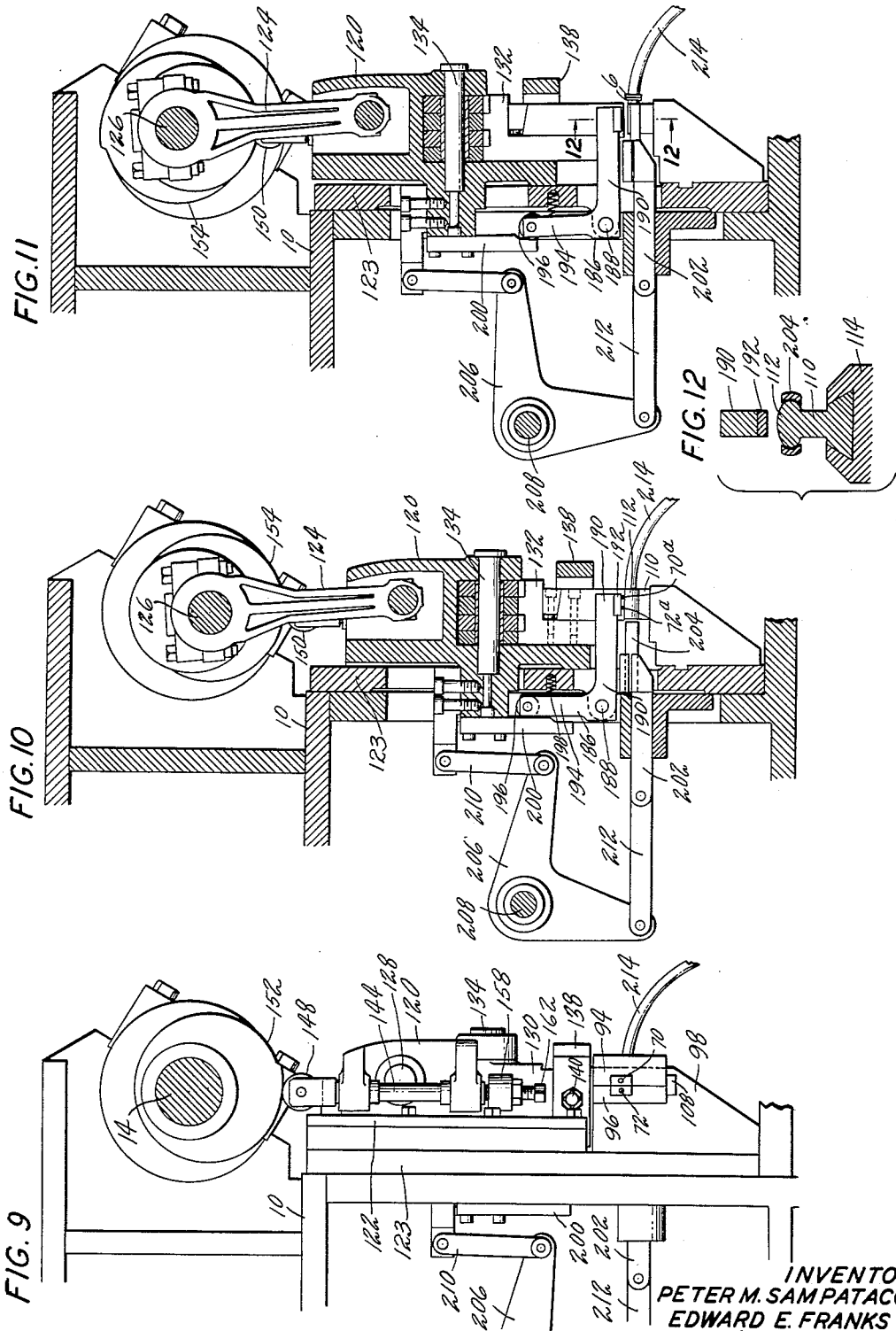

July 12, 1955     P. M. SAMPATACOS ET AL     2,712,835
MACHINE FOR MAKING PARTLY OPEN RINGS
Filed April 25, 1952     4 Sheets-Sheet 4
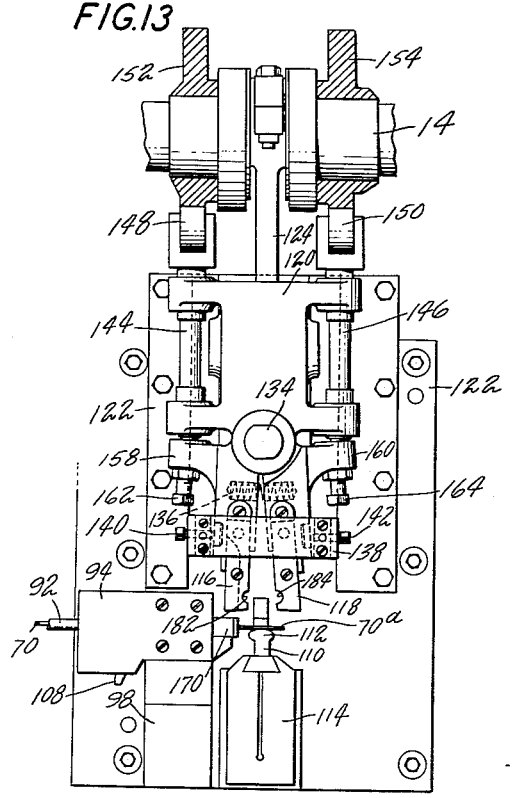
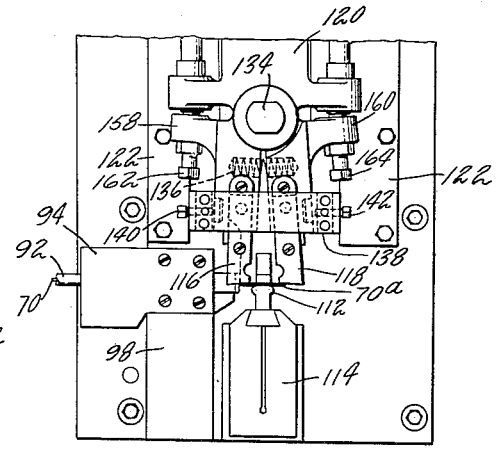
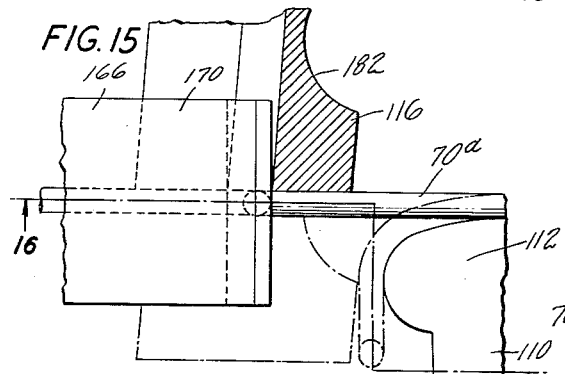
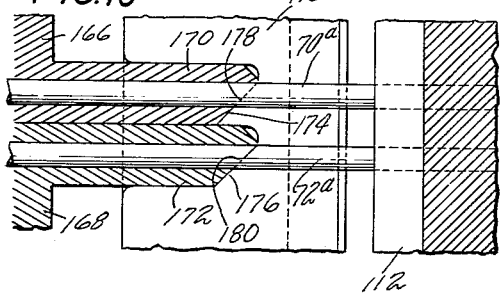
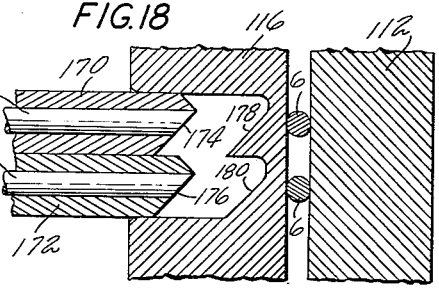
INVENTORS
PETER M. SAMPATACOS
EDWARD E. FRANKS JR.
BY S. Jay Teller
ATTORNEY United States Patent Office 2,712,835
Patented July 12, 1955

2,712,835

MACHINE FOR MAKING PARTLY OPEN RINGS

Peter M. Sampatacos, Torrington, and Edward E. Franks, Jr., Litchfield, Conn., assignors to The Torrington Manufacturing Company, Torrington, Conn., a corporation of Connecticut Application April 25, 1952, Serial No. 284,306

3 Claims. (Cl. 140—71)

The invention relates to a machine for making partly open rings which preferably have pointed ends, such rings being commonly known as "hog rings."

The general object of the invention is to provide a fully automatic machine operable in cycles for making rings of the stated type. More specifically objects of the invention are to provide various features of structure and arrangement which result in simplicity of construction, in reliability and accuracy of operation, and in adaptability for changes in ring size.

In accordance with the invention two rings may be made simultaneously during each cycle, and a further object of the invention is to provide for the simultaneous making of two rings.

In the drawings we have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a side view of a hog ring of the type adapted to be made by a machine embodying the invention.

Fig. 2 is a left side view of a machine embodying the invention, with the wire straightening device omitted.

Fig. 3 is a front view.

Fig. 4 is an enlarged fragmentary front view with certain parts in section along the line 4—4 of Fig. 2.

Fig. 5 is a fragmentary horizontal sectional view taken along the line 5—5 of Fig. 4.

Fig. 6 is an enlarged fragmentary vertical sectional view taken along the line 6—6 of Fig. 4.

Fig. 7 is a fragmentary horizontal sectional view taken along the line 7—7 of Fig. 6.

Fig. 8 is a fragmentary horizontal sectional view taken along the line 8—8 of Fig. 4.

Fig. 9 is a fragmentary vertical sectional view taken along the line 9—9 of Fig. 4.

Fig. 10 is a fragmentary vertical sectional view taken along the line 10—10 of Fig. 4.

Fig. 11 is a view similar to Fig. 10 but showing some of the parts in different positions.

Fig. 12 is an enlarged fragmentary vertical sectional view taken along the line 12—12 of Fig. 11.

Fig. 13 is a fragmentary front view similar to a portion of Fig. 4 but showing some of the parts in different positions.

Fig. 14 is a view similar to a portion of Fig. 13 but showing some of the parts in other different positions.

Fig. 15 is an enlarged fragmentary front view similar to Fig. 14 but showing only the cutting tools and the immediately associated parts, the movable tool being shown in vertical section.

Fig. 16 is a horizontal sectional view taken along the line 16—16 of Fig. 15.

Fig. 17 is a view similar to Fig. 15 but showing the movable cutting and forming tool in a different position.

Fig. 18 is a horizontal sectional view taken along the line 18—18 of Fig. 17.

*The hog ring*

A hog ring 6 such as is made by the machine is shown in Fig. 1, the ring being partly open and approximately elliptical in shape. The ends of the wire constituting the ring are beveled to provide two points 8, 8 which are oppositely disposed at the rear and at the front.

*General organization*

The machine for making the hog ring is operable continually in cycles, one ring or two rings being made during each cycle. The machine comprises a main upper frame 10, mounted on a base 12. A main horizontal power shaft 14 is rotatably mounted in the upper portion of the frame 10 in bearings 16, 18 and 20. As shown, the shaft 14 comprises two parts with a coupling between the parts. The shaft 14 is driven by an electric motor 22 on the base 12 by means of belts 24, 24 extending around a pulley 26 on the shaft 14 and around a pulley 28 on the motor shaft. The shaft 14 makes one rotation during each cycle of the machine.

A hand wheel 30 is preferably secured to the shaft 14. By means of the hand wheel the shaft and the operative parts of the machine can be slowly moved manually for purposes of setup and adjustment.

Two wires for making the hog rings are fed intermittently during each cycle by means of a reciprocating feed device indicated generally at 32. Each operation of the feed device advances each wire sufficiently for the making of one hog ring. The wires are withdrawn from suitable reels at the left, which are not shown, and pass between series of straightening rollers indicated generally at 34 in Fig. 3.

During each cycle and following each operation of the feed device 32, the fed portions of the wires are cut off, clamped and formed by mechanism indicated generally at 36. After cutting and forming, the completed hog rings are ejected toward the front of the machine.

As will be apparent from the more specific description which follows, the machine is preferably constructed and arranged for feeding two wires simultaneously and for making two hog rings simultaneously. It will be understood, however, that the invention is not necessarily so limited, and that provision may be made for feeding only a single wire and for making only one ring at a time.

Throughout the following detailed description, various parts will be described as being "vertical" or "horizontal" and as being movable "upwardly" or "downwardly" or "horizontally." It will be understood that these and similar terms are used chiefly for convenience of description to show the relationship of parts and motions, and that they are not intended to necessarily limit the scope of the invention.

*Feed mechanism*

Referring more particularly to Figs. 2, 4, 5, 6 and 7, a horizontally reciprocable feed slide 38 is provided. The slide 38 is supported upon and guided by two horizontal rods 40, 40 mounted on the main frame 10 by brackets 42, 42.

For reciprocating the slide 38 there is provided a bell crank 44 mounted on the main frame for oscillation about a horizontal axis at 46. One arm 48 of the bell crank is connected with the slide 38 by means of links 50, 50. The other arm 52 of the bell crank is connected by means of a connecting rod 54 with an eccentric pin 56 on the left end of the shaft 14. Interposed between the connecting rod 54 and the eccentric pin 56 is a ball bearing 58 which permits not only relative rotative movement but also a limited amount of angular movement of the connecting rod in accordance with the oscillation of the bell crank. The arm 52 of the bell crank carries a collar 60 pivotally movable about an axis extending lengthwise of the arm. The collar 60 carries two oppositely disposed pivot pins 62, 62 which extend through bearing apertures in the lower portion of the connecting rod 54. By reason of the pivoted collar 60 and the pivot pins 62, 62 a universal connection is provided between the connecting rod 54 and the bell crank arm 52.

In order that the extent of reciprocation of the slide 38 may be varied the eccentric pin 56 is transversely adjustable with respect to the shaft 14. As shown in Fig. 5, the pin 56 is carried by a transversely movable block 64. The block 64 is engaged with a transverse screw 66 having a head 68 by means of which it may be turned. By turning the screw 66, the block 64 and the eccentric pin 56 may be moved to eccentrically position said pin to any desired extent within a predetermined limit. The extent of reciprocation of the slide 38 varies with the eccentricity of the pin 56.

The two wires to be fed are shown at 70 and 72, and suitable means are provided on the slide 38 for gripping the wires to move them simultaneously with the slide when the slide moves from left to right. As shown, the gripping means for the wire 72 is carried directly on the slide 38 and the gripping means for the wire 70 is carried on a plate 74 secured to the slide. The two gripping means are the same in construction and it will be sufficient to describe in detail the means on the plate 74 for the wire 70.

The plate 74 is provided with a longitudinal hole 76 for the wire. Closely adjacent the hole and at the right thereof are two transverse horizontal rollers 78 and 80 positioned respectively above and below the wire. The upper roller 78 engages at the top with an inclined surface and the lower roller 80 engages at the bottom with an inclined surface. The two surfaces are oppositely inclined and converge toward the left. Preferably the rollers 78 and 80 are hardened and there are hardened inserts 82 and 84 which provide said inclined surfaces. A lever 86 is provided which is horizontally pivoted at 88 to the plate 74. The upper portion of the lever 86 is bifurcated to clear the wire 70 and the lever has faces at the left which engage the rollers 78 and 80. A spring 90 engages the plate 74 and the said lever 86 to bias the latter in the counterclockwise direction and to thus bias the rollers 78 and 80 toward the left. It will be seen that, by reason of the lever 86 and the inclined surfaces, the rollers 78 and 80 are continually pressed against the wire. When the slide moves toward the right the rollers cause the wire to move with the slide. When the slide moves toward the left the rollers slide along the stationary wire. Inasmuch as the rollers of each gripping means are in constant engagement with the wire, there is no lost motion and the wire is fed to an extent corresponding exactly to the length of the slide reciprocation. During each feeding movement the wires 70 and 72 are advanced to provide wire portions 70a and 72a of suitable lengths for the making of rings.

Preferably, in order to more definitely assure movement of the wires with the slide, an additional gripping means is provided for each wire at the left of the gripping means specifically described. The two additional gripping means for the two wires are or may be of the same construction and no additional description is necessary.

Two tubes 92 are provided at the right of the slide 38 for guiding the two wires 70 and 72 during feeding movements thereof. These tubes are carried by the right bracket 42.

To prevent any possible retrograde movement of the wires after feeding, stationary gripping devices are provided for the respective wires, as shown in Figs. 4 and 9. These gripping devices are carried by blocks 94 and 96 supported by a bracket 98. Each gripping device is similar to those already described and comprises upper and lower rollers 100 and 102, inclined inserts 104 and 106, and a spring biased lever 108.

*Cutting and forming mechanism*

A stationary anvil is provided which extends transversely. The anvil comprises a relatively narrow lower supporting portion 110 and a substantially wider upper head 112 with a fixed exterior convex cross sectional shape corresponding to the required interior shape of the hog rings 6 to be formed. The anvil is secured to a block 114 carried by the main frame 10. The top of the anvil head is tangent to the bottoms of the wires as they are fed.

Two movable forming tools 116 and 118 are provided for cooperation with the head 112 of the anvil to bend the wires and thereby form the rings. The left tool 116 preferably also serves as a cutting tool as hereinafter explained. The mechanism which carries and operates said tools 116 and 118 will now be described.

Carried by the main frame 10 is a vertically movable slide 120, which is guided by means forming a vertical guideway and including guide plates 122, 122. The said guide means is supported on a vertical plate 123 forming a part of or rigidly connected with the main upper frame 10. A connecting rod 124 is provided which engages at its upper end with an eccentric crank pin 126 forming a part of the main shaft 14. At its lower end the connecting rod engages a bearing pin 128 which engages the slide 120. It will be seen that the connecting rod causes downward and upward movements of the slide during each cycle, said slide being in its lowermost position as shown in Figs. 4, 9 and 10 and being in its uppermost position as shown in Figs. 11 and 13.

Arms 130 and 132 are pivoted to the slide 120 at the front thereof, preferably by means of a common transverse horizontal pivot pin 134. By means of springs 136 said arms 130 and 132 are biased for movements about the axis of the pin in opposite directions and away from each other. The before-mentioned tools 116 and 118 are detachably secured respectively to the lower portions of said arms 130 and 132. Carried by a bracket 138 on the slide 120 near the bottom thereof are adjustable screws 140 and 142 for engaging the lower portions of the respective arms 130 and 132 to limit movement of said arms and of the tools by reason of the action of the springs 136. The screws 140 and 142 are so adjusted that the tools, during the initial portion of their downward movement, are spaced apart as shown in Figs. 13 and 14. The tools are thus initially held in a longitudinally spaced relationship with each other which is such that they are at opposite sides of transverse vertical planes through the edge of the anvil head 112. When the lower ends of the tools move downwardly past the anvil, they are spaced therefrom by distances approximately equal to the diameter of the wires. Fig. 15 shows the left tool 116 so spaced.

Supported and guided on the slide 120 and vertically movable relatively thereto are two vertical rods 144 and 146, these rods being symmetrically disposed with respect to the vertical central plane of the slide. Secured respectively to the upper ends of the rods 144 and 146 are rollers 148 and 150. These rollers respectively engage similar cam members 152 and 154 secured to the main shaft 14. The arms 130 and 132 are provided respectively with lateral extensions 158 and 160 which are threaded to receive substantially vertical screws 162 and 164, the upper ends of the screws being engageable respectively with the lower ends of the rods 144 and 146. The springs 136 bias the arms 130 and 132 so that the extensions 158 and 160 and also the screws 162 and 164 tend to move upwardly. Thus the springs 136 also bias the rods 144 and 146 for upward movement so as to maintain the rollers 148 and 150 in engagement with the cam members 152 and 154. When the rods 144 and 146 are moved downwardly relatively to the slide 120 they engage the screws 162 and 164 to swing the arms 130 and 132 toward each other and to thus move the tools 116 and 118 toward each other. When the rods 144 and 146 move upwardly relatively to the slide, said rods permit the screws 162 and 164 to move upwardly so as to permit the arms 130 and 132 together with the tools 116 and 118 to move away from each other to the extents permitted by the stop screws 140 and 142.

During feeding, the wires 70 and 72 move through apertures in members 166 and 168 connected respectively with the before-mentioned blocks 94 and 96. The members 166 and 168 are provided respectively with extensions or quills 170 and 172 which are relatively narrow horizontally and which constitute stationary cutters. The right end portions of the quills or cutters 170 and 172 at the retrograde ends of the wire portions 70a and 72a have vertical beveled faces 174 and 176 as clearly shown in Figs. 16 and 18, these faces preferably being at angles of about 45° to the axes of the wires or to the longitudinal direction. The lower portions of the edges of the apertures in the quills constitute stationary cutting edges in vertical planes. Preferably the members 166 and 168 with their quills or cutters 170 and 172 are longitudinally adjustable and are adapted to be held in longitudinally adjusted positions by suitable means not shown. At the end of each feeding movement the wire portions 70a and 72a extend toward the right beyond the beveled faces 174 and 176 of the stationary cutters. The feed mechanism is so adjusted that each of the wire portions 70a and 72a is of exactly the proper length for making one hog ring and said wire portions are tangent to the upper face of the anvil head 112.

As clearly shown in Figs. 16 and 18, the left tool 116 which is adapted to serve as a cutting tool is formed with a longitudinal vertically extending groove shaped and positioned to receive the two projecting quills or cutters 170 and 172 on the members 166 and 168. Preferably the side walls of the groove engage the sides of the quills or cutters 170 and 172. At the bottom of said groove and at the inner face thereof the cutting tool 116 is provided with two cutting edges 178 and 180, these cutting edges being inclined in conformity with the inclinations of the faces 174 and 176 on the quills or cutters 170 and 172.

As the slide 120 is moved downwardly by the connecting rod 124, the bottoms of the tools 116 and 118 engage the wire portions 70a and 72a as shown in Fig. 14. The full lines in Fig. 15 show the tool 116 in the same position as in Fig. 14. As the tool 116 continues to move downwardly, its cutting edges 178 and 180 cooperate with the cutting edges at beveled faces 174 and 176 of the stationary quills or cutters 170 and 172 to cut or sever the wires at angles, the cut or severed wire portions 70a and 72a being thus provided with points 8 such as shown in Fig. 1. By means of the screw 140 the tool 116 may be adjusted longitudinally so as to position it accurately for the proper cooperation of its cutting edges during downward movement with the cutting edges of the stationary quills or cutters 170 and 172.

As the tools continue to move downwardly, the bottoms thereof bend the wire portions 70a and 72a around the anvil head 112 in conformity with the shape of the upper portion thereof so as to partly form the rings. This is clearly shown with respect to the tool 116 by the dotted lines in Fig. 15 and it will be understood that the tool 118 acts similarly.

The tools 116 and 118 are provided respectively with recesses 182 and 184 in their adjacent sides and above their bottoms. These recesses conform in shapes to the side portions of the exterior shape of the rings 6 to be formed. The downward movement of the slide 120 continues the downward movement of the tools to positions wherein said tool recesses 182 and 184 are in substantial horizontal register with the anvil head 112.

The cam members 152 and 154 are so shaped that during the major portion of the cycle the rods 144 and 146 are moved substantially in unison with the slide 120. However, when the tools approach the positions wherein the recesses 182 and 184 are in horizontal register with the anvil head 112, as indicated by the dotted lines in Fig. 15, the cam members 152 and 154 engage the rollers 148 and 150 so as to move the rods 144 and 146 downwardly relatively to the slide 120. In so moving, the rods 144 and 146 act upon the screws 162 and 164 to swing the arms 130 and 132 toward each other, the tools 116 and 118 being similarly moved. The extent of movement of the tools toward each other can be adjusted by means of said screws 162 and 164. As the tools 116 and 118 are thus moved toward each other they additionally bend the wire portions 70a and 72a around the anvil head 112 in conformity with the shape of said head and the shapes of the recesses 182 and 184. Figs. 4, 17 and 18 show the tools in their final wire bending positions. With the tools in the last said positions the slide 120 is in its lowermost position as shown in Figs. 9 and 10.

As soon as the tools reach the positions shown in Figs. 4, 17 and 18 the described relative movements of the several parts are reversed. The cam members 152 and 154 permit the rods 144 and 146 to move relatively upwardly thus permitting the tools 116 and 118 to be separated by the springs 136 so as to disengage the completed hog rings, said completed rings being left on the anvil head 112. This separating movement of the tools permits them to be moved upwardly by the slide.

Referring particularly to Fig. 4, it will be observed that the tools 116 and 118 are in their lowermost positions. The feed slide 38 is approximately in its midway position and is moving toward the left. After one-fourth of a cycle said tools will have been moved upwardly so that their bottoms are approximately at the level of the top of the anvil. The feed slide 38 will then be in its extreme left position and will be about to move toward the right for feeding the wires. The timing is therefore such that the wires are fed while the tools are above the level of the top of the anvil and out of the paths of the wires.

The operations above described are repeated indefinitely during successive cycles. Successive wire portions 70a and 72a are fed by the feeding mechanism during each cycle and the tools 116 and 118 are moved as described during each cycle to cut off and bend the successive wire portions.

Hog rings of any different size within the capacity of the machine may be made by substituting an anvil having a head 112 of a different size corresponding to that of the required rings, and by substituting differently shaped tools 116 and 118. The feed mechanism is adjusted to feed wire portions 70a and 72a of the lengths required for the differently sized rings. The members 166 and 168 with their quills or cutters 170 and 172 are longitudinally adjusted in accordance with the new lengths of the wire portions 70a and 72a. The screws 140 and 142 are adjusted for proper cooperation of the substitute tools 116 and 118 with the substitute anvil and with the differently positioned quills or cutters 170 and 172.

*Clamping mechanism*

It is necessary or in any event preferable to provide means for clamping the wire portions 70a and 72a against the anvil head 112 while said wire portions are being cut off and bent. For this purpose there is provided a substantially vertically movable member engageable with the tops of the wire portions 70a and 72a and having a width in the longitudinal direction no greater than the spacing between the tools 116 and 118 when the tools have been moved toward each other to the maximum extent. As shown, there is a bell crank 186 pivoted to the plate 123 at 188 for movement about a longitudinal horizontal fixed axis. The bell crank has a forwardly extending arm 190, the forward portion of which carries a shoe 192 and is between the tools 116 and 118. The arm 190 and the shoe 192 collectively constitute the aforesaid substantially vertically movable member which is engageable with the wire portions 70ª and 72ª to clamp them against the anvil head 112 as clearly shown in Fig. 10.

The bell crank has an upwardly extending arm 194 which carries a roller 196. A spring 198 interposed between the arm 194 and the plate 123 biases the bell crank for movement in the clockwise direction, that is, in the direction to disengage the shoe 192 from the wire portions. Secured to a rearward projection on the slide 120 is a cam member 200 having a cam face engageable with the roller 196. During the major portion of the cycle the cam member 200 holds the bell crank lever in position with the shoe 192 in engagement with the wire portions as shown in Fig. 10. However, when the slide 120 is in the upper portion of its cycle of movements, the cam member 200 permits the spring 198 to move the bell crank lever to the position shown in Fig. 11 with the shoe 192 out of wire engaging position. Wire feeding takes place with the parts in the positions shown in Fig. 11.

*Ejecting mechanism*

After each two hog rings have been completed in the manner previously described it is necessary to move them in a transverse direction and longitudinally of the anvil head 112 in order that they may not interfere with the forming of the next two hog rings. For this purpose an ejector 202 is provided, this being a forwardly and rearwardly movable slide. This ejector has two prongs 204, 204 which are spaced apart so as to be positioned at opposite sides of the anvil head 112 when the ejector or slide 202 is in its forward position. The prongs 204, 204 are positioned below the top of the anvil head 112 as shown in Fig. 12 so as not to interfere with the feeding of the next two wire portions 70ª and 72ª. The slide 202 is operated by a suitable mechanism connected with the slide 120. As shown there is a bell crank 206 pivoted for movement about a longitudinal horizontal axis at 208. One arm of the bell crank is connected by a link 210 with the before-mentioned rearward projection on the slide 120 and the other arm of the bell crank is connected by means of a link 212 with the slide 202. The timing is such that the ejector or slide 202 and including the prongs 204, 204 is moved forward immediately following the completion of the hog rings and the release thereof by the clamping shoe 192.

The hog rings may be ejected into a suitable receptacle provided at the front, but preferably a carrier rod 214 is pprovided which is shaped to fit the interiors of the rings. The rod 214 is supported in any suitable manner with its upper end in alignment with the anvil head 112. Thus the completed rings are ejected from the anvil onto the carrier rod 214. When one carrier rod is completely or substantially completely filled with rings it is replaced by another similar rod.

The invention claimed is:

1. In a machine operable in cycles for making partly open wire rings, the combination of a transversely extending stationary anvil having a head with an exterior convex shape conforming to the required interior concave shape of the partly open rings, a horizontal shaft making one rotation during each cycle and having an eccentric crank pin between its ends, means operable by the shaft during each rotation for placing in a horizontal longitudinal position above and adjacent the anvil head a severed wire portion having the requisite length for a ring, a vertically movable slide below the shaft, a connecting rod engaging the eccentric pin for moving the slide downwardly and upwardly during each shaft rotation, two similar arms connected with the slide and each pivotally movable relatively thereto about a transverse horizontal axis, two tools connected respectively with said arms and initially located above said wire portion in longitudinally spaced relationship with each other and at opposite sides of transverse vertical planes through the edges of the anvil head, said tools being movable downwardly with the slide in said spaced relationship past the anvil head at opposite sides thereof to cause the bottoms of both tools to engage said wire portion and bend it around the anvil head in conformity with the shape of the upper portion thereof so as to partly form a ring, two vertical rods carried by the slide and vertically movable relatively thereto, means serving upon vertical movement of said rods with respect to the slide for causing pivotal movements of said arms to thereby move the tools longitudinally, and two cams on the shaft for causing vertical movements of said rods with respect to the slide to thereby move the arms and the tools toward each other when said tools have completed the last said bending of the wire portion, said tools upon being so moved toward each other serving to additionally bend the wire portion around the anvil head in conformity with the shape thereof so as to complete the forming of the ring.

2. In a machine operable in cycles for making partly open wire rings, the combination of a transversely extending stationary anvil having a head with an exterior convex shape conforming to the required interior concave shape of the partly open rings, a horizontal shaft making one rotation during each cycle and having an eccentric crank pin between its ends, means operable by the shaft during each rotation for placing in a horizontal longitudinal position above and adjacent the anvil head a severed wire portion having the requisite length for a ring, a vertically movable slide below the shaft, a connecting rod engaging the eccentric pin for moving the slide downwardly and upwardly during each shaft rotation, two similar arms connected with the slide and each pivotally movable relatively thereto about a transverse horizontal axis near the top thereof, spring means for biasing the arms for movement in opposite directions away from each other, means for limiting movements of the arms by the spring means at predetermined positions, two tools connected respectively with said arms and initially located above said wire portion which tools are in longitudinally spaced relationship with each other and at opposite sides of transverse vertical planes through the edges of the anvil head when the arms are in said predetermined positions, said tools being movable downwardly with the slide in said spaced relationship past the anvil head at opposite sides thereof to cause the bottoms of both tools to engage said wire portion and bend it around the anvil head in conformity with the shape of the upper portion thereof so as to partly form a ring, two vertical rods carried by the slide and vertically movable relatively thereto, lateral extensions on said arms located respectively below said rods and movable downwardly thereby upon relative downward movements of the rods, said lateral extensions upon downward movements causing pivotal movements of said arms to thereby move the tools longitudinally, and two cams on the shaft for causing relative downward movements of said rods to thereby pivotally move said extensions and said arms so as to move the tools toward each other when said tools have completed the last said bending of the wire portion, said tools upon being so moved toward each other serving to additionally bend the wire portion around the anvil head in conformity with the shape thereof so as to complete the forming of the ring.

3. A machine as set forth in claim 2, wherein said extensions on the arms are provided respectively with vertically adjustable screws which engage the bottoms of the said rods.

References Cited in the file of this patent

UNITED STATES PATENTS 213,081    Williams _____ Mar. 11, 1879

(Other references on following page)

UNITED STATES PATENTS

| Number | Name | Date |
|---|---|---|
| 242,789 | Nuttall | June 14, 1881 |
| 250,329 | Alpress | Dec. 6, 1881 |
| 356,298 | Adt | Jan. 18, 1887 |
| 418,145 | Taylor | Dec. 24, 1889 |
| 442,430 | Fontaine | Dec. 9, 1890 |
| 494,535 | Vanstone | Mar. 28, 1893 |
| 692,528 | Kirkpatrick | Feb. 4, 1902 |
| 746,263 | Baker | Dec. 8, 1903 |
| 865,001 | Thompson | Sept. 3, 1907 |
| 1,039,837 | Stecher | Oct. 1, 1912 |
| 1,046,453 | Euchenhofer | Dec. 10, 1912 |
| 1,342,712 | Garllus | June 8, 1920 |
| 1,691,516 | Glore | Nov. 13, 1928 |
| 1,709,938 | Goldberg | Apr. 23, 1929 |
| 1,756,434 | Owen | Apr. 29, 1930 |
| 2,130,318 | Cruzan | Sept. 13, 1938 |
| 2,138,495 | Lewis | Nov. 29, 1938 |
| 2,222,220 | Binch | Nov. 19, 1940 |
| 2,432,339 | Reynolds | Dec. 9, 1947 |
| 2,578,216 | Young | Dec. 11, 1951 |
| 2,640,986 | Blumensaadt | June 9, 1953 |